US012667804B2

(12) United States Patent
Maeda et al.

(10) Patent No.: US 12,667,804 B2
(45) Date of Patent: Jun. 30, 2026

(54) GAS-TREATING DEVICE

(71) Applicant: KABUSHIKI KAISHA KOBE SEIKO SHO (KOBE STEEL, LTD.), Hyogo (JP)

(72) Inventors: Norihide Maeda, Kobe (JP); Akira Kishimoto, Kobe (JP); Takuo Shigehisa, Kobe (JP); Ken Nakanishi, Kakogawa (JP); Kunihiko Shimizu, Hyogo (JP)

(73) Assignee: KABUSHIKI KAISHA KOBE SEIKO SHO (KOBE STEEL, LTD.), Hyogo (JP)

( * ) Notice: Subject to any disclaimer, the term of this patent is extended or adjusted under 35 U.S.C. 154(b) by 710 days.

(21) Appl. No.: 18/044,854

(22) PCT Filed: Sep. 2, 2021

(86) PCT No.: PCT/JP2021/032363
§ 371 (c)(1),
(2) Date: Mar. 10, 2023

(87) PCT Pub. No.: WO2022/074976
PCT Pub. Date: Apr. 14, 2022

(65) Prior Publication Data
US 2023/0364549 A1 Nov. 16, 2023

(30) Foreign Application Priority Data
Oct. 5, 2020 (JP) ................................. 2020-168357

(51) Int. Cl.
*B01D 53/14* (2006.01)
*B01D 53/78* (2006.01)

(52) U.S. Cl.
CPC ..... *B01D 53/1456* (2013.01); *B01D 53/1475* (2013.01); *B01D 53/78* (2013.01); *B01D 2252/204* (2013.01)

(58) Field of Classification Search
None
See application file for complete search history.

(56) References Cited

U.S. PATENT DOCUMENTS

2013/0203155 A1 8/2013 Penders et al.
2014/0086811 A1 3/2014 Saito et al.
(Continued)

FOREIGN PATENT DOCUMENTS

CN 111135678 A 5/2020
GB 2494639 A 3/2013
(Continued)

OTHER PUBLICATIONS

Advanced Filtration—Understanding Plate Heat Exchangers: Types, Functionality, and Capacity Calculation. [online] [retrieved on Dec. 17, 2025], evidentiary reference. pp. 1-8. https://advancedfiltration. com/understanding-plate-heat-exchangers-types-functionality-and-capacity-calculation/ (Year: 2024).*
(Continued)

*Primary Examiner* — Jelitza M Perez
(74) *Attorney, Agent, or Firm* — Studebaker Brackett PLLC

(57) ABSTRACT

Provided is a gas-treating device including: an absorption device that receives an absorbent to absorb an acidic compound in a gas to be treated into the absorbent; a release device into which the absorbent having absorbed the acidic compound in the absorption device is introduced; a heater for heating the absorbent in the release device to release the acidic compound contained in the absorbent from the absorbent; and a multi-fluid heat exchanger for heating the
(Continued)

absorbent before being supplied from the absorption device to the release device by a fluid containing the acidic compound discharged from the release device and the absorbent before being supplied from the release device to the absorption device.

7 Claims, 7 Drawing Sheets

(56) References Cited

U.S. PATENT DOCUMENTS

| | | | |
|---|---|---|---|
| 2014/0112855 A1 | 4/2014 | Mori | |
| 2016/0296880 A1 | 10/2016 | Saito et al. | |
| 2018/0369744 A1 | 12/2018 | Baxter et al. | |

FOREIGN PATENT DOCUMENTS

| | | |
|---|---|---|
| WO | 2013/000953 A2 | 1/2013 |
| WO | 2013/114936 A1 | 8/2013 |
| WO | 2016/144179 A1 | 9/2016 |

OTHER PUBLICATIONS

Machida, H. et al.; "Development of phase separation solvent for CO2 capture by aqueous (amine+ether) solution"; The Journal of Chemical Thermodynamics; Oct. 2017; pp. 64-70; vol. 113; Elsevier; URL: https://www.sciencedirect.com/science/article/abs/pii/S0021961417301970.

The partial supplementary European search report (R. 164 EPC) issued by the European Patent Office on Feb. 28, 2024, which corresponds to European Patent Application No. 21877279.6-1101 and is related to U.S. Appl. No. 18/044,854.

The extended European search report issued by the European Patent Office on Jun. 24, 2024, which corresponds to European Patent Application No. 21877279.6, and is related to U.S. Appl. No. 18/044,854.

Notification Concerning Transmittal of International Preliminary Report on Patentability and Translation of Written Opinion of the International Searching Authority; PCT/JP2021/032363; mailed on Apr. 20, 2023.

* cited by examiner

GAS-TREATING DEVICE

TECHNICAL FIELD

The present invention relates to a gas-treating device.

BACKGROUND ART

There are known various methods for recovering an acidic compound from a large volume of gas ($CO_2$-containing gas) containing the acidic compound of carbon dioxide ($CO_2$) or the like, or of exhaust gas from a power plant or excessive gas in a blast furnace. Examples of this type of recovery method include a chemical absorption method such as an amine absorption method. The chemical absorption method uses an alkaline aqueous solution, such as an amine aqueous solution, as an absorbent. When a $CO_2$-containing gas is brought into contact with the absorbent, $CO_2$ is absorbed by the absorbent, and then $CO_2$ can be released from the absorbent by heating the absorbent having absorbed $CO_2$. Thus, the released $CO_2$ can be recovered.

The chemical absorption method using an amine-based absorbent requires a large amount of thermal energy in a step of releasing carbon dioxide from an amine liquid having absorbed carbon dioxide (generally referred to as a liquid regeneration step), and thus causing an increase in separation cost. Examples of a method for reducing regeneration energy of an absorbent include a generally used method for recovering excess heat in a process, such as a widely used method for exchanging heat between a low-temperature liquid (rich liquid) accumulated in a bottom of a $CO_2$ absorption tower and a high-temperature liquid (lean liquid) accumulated in a bottom of a $CO_2$ release tower. For example, Patent Literature 1 below discloses a carbon dioxide recovery apparatus including not only a regeneration heat exchanger 83 that heats a rich liquid with a lean liquid flowing out of a release tower 81, but also a carbon dioxide generator 85 that heats the rich liquid with a carbon-dioxide-containing water vapor flowing out of the release tower 81, as illustrated in FIG. 7. Thus, a flow divider 89 is provided to divide the rich liquid from a $CO_2$ absorption tower 87 into a flow path toward the regeneration heat exchanger 83 and a flow path toward the carbon dioxide generator 85.

The recovery apparatus disclosed in Patent Literature 1 enables improvement in heat recovery efficiency by heating the rich liquid with not only the lean liquid but also the carbon dioxide-containing water vapor. Unfortunately, the recovery apparatus requires the flow divider 89 that divides the rich liquid into the flow path toward the regeneration heat exchanger 83 and the flow path toward the carbon dioxide generator 85, and desired heat recovery efficiency cannot be obtained unless a flow rate of the rich liquid flowing through each flow path is optimally designed.

CITATION LIST

Patent Literature

Patent Literature 1: JP 2014-4525 A

SUMMARY OF INVENTION

An object of the present invention is to obtain heat recovery with a lean liquid and desired heat recovery efficiency with a fluid containing an acidic compound without requiring a branching design.

A gas-treating device according to an aspect of the present invention includes: an absorption device that receives an absorbent to absorb an acidic compound in a gas to be treated into the absorbent; a release device into which the absorbent having absorbed the acidic compound in the absorption device is introduced; a heater for heating the absorbent in the release device to release the acidic compound contained in the absorbent from the absorbent; and a multi-fluid heat exchanger for heating the absorbent before being supplied from the absorption device to the release device by a fluid containing the acidic compound discharged from the dissipation device and the absorbent before being supplied from the release device to the absorption device.

DESCRIPTION OF EMBODIMENTS

Hereinafter, embodiments will be described with reference to the accompanying drawings. The embodiments below are each an example embodying the present invention, and are not intended to limit the technical scope of the present invention.

First Embodiment

Figure 1:
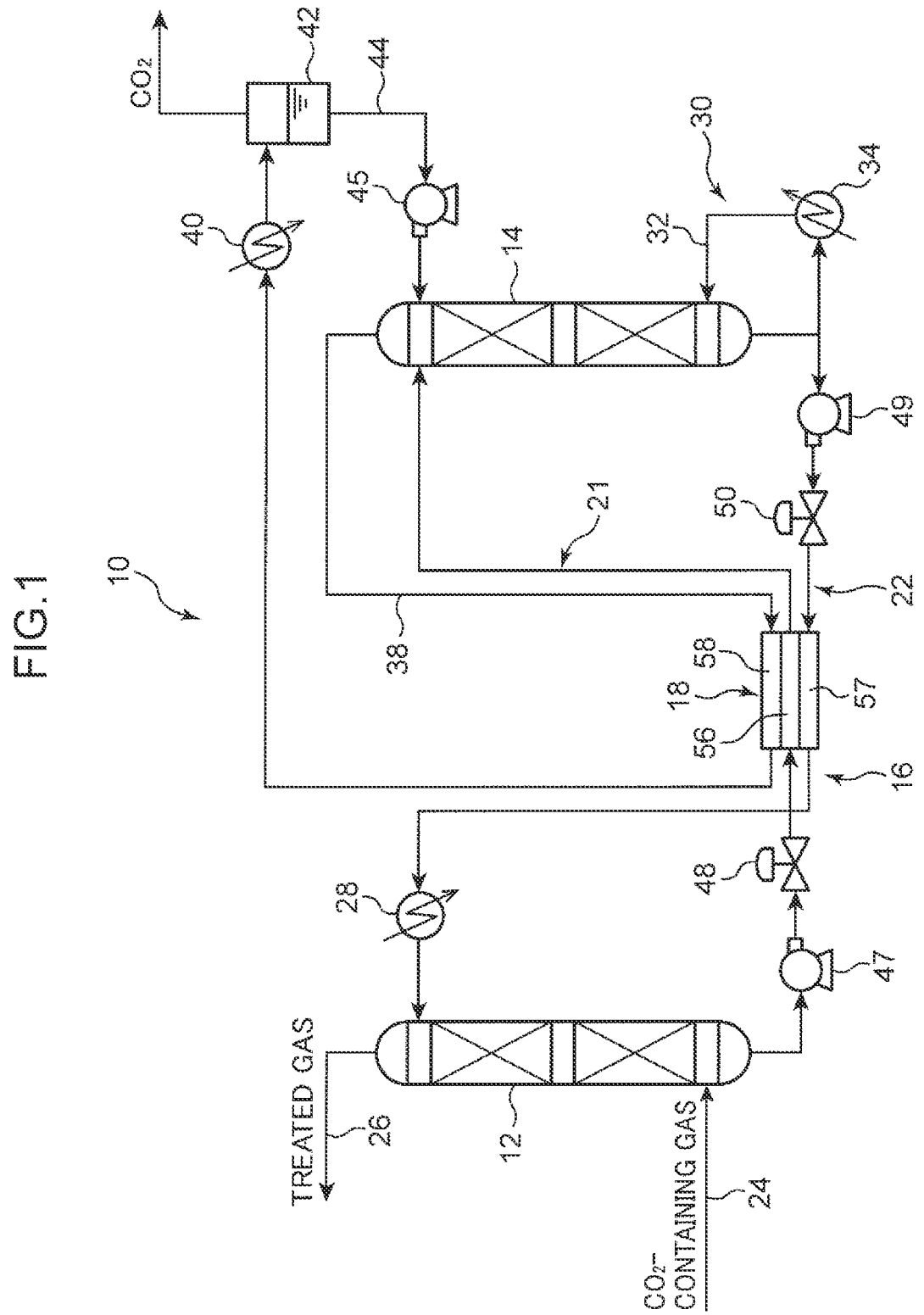
FIG. 1 is a diagram schematically illustrating a general configuration of a gas-treating device according to a first embodiment.

A gas-treating device 10 according to a first embodiment illustrated in FIG. 1 is a device for separating an acidic compound from a gas to be treated by a chemical absorption method using an amine-based absorbent. Although the acidic compound separated by the gas-treating device 10 is not particularly limited as long as forming an acidic aqueous solution, examples thereof include hydrogen chloride, carbon dioxide, sulfur dioxide, and carbon disulfide. The acidic compound is a gaseous compound that produces an acid upon dissolution in water.

As illustrated in FIG. 1, the gas-treating device 10 includes an absorption device 12, a release device 14, a circulation path 16, and a multi-fluid heat exchanger 18. The circulation path 16 includes a rich liquid flow path 21 for extracting an absorbent from the absorption device 12 and introducing the absorbent into the release device 14, and a lean liquid flow path 22 for extracting the absorbent from the release device 14 and returning the absorbent to the absorption device 12.

The absorption device 12 is connected to a gas supply path 24 for supplying a gas to be treated such as a process gas containing $CO_2$, a gas discharge path 26 for discharging a gas (treated gas) after the treatment, the rich liquid flow path 21 for feeding the absorbent to the release device 14, and the lean liquid flow path 22 for returning the absorbent from the release device 14 to the absorption device 12.

The gas supply path 24 is connected to a lower part of the absorption device 12, the lower part being located close to a bottom of the absorption device 12. The gas discharge path 26 is connected to an upper end of the absorption device 12, the upper end located at the top of the absorption device 12. The rich liquid flow path 21 is connected to the bottom of the absorption device 12, i.e., a lower end or near the lower end. That is, the rich liquid flow path 21 is connected to a position where the absorbent accumulated in the absorption device 12 can be extracted. The lean liquid flow path 22 is connected to the top of the absorption device 12, i.e., the upper end or near the upper end thereof. That is, the lean liquid flow path 22 is connected to a position where the absorbent returned from the release device 14 can flow down from above. The lean liquid flow path 22 is provided with a cooler 28 for cooling the absorbent. The cooler 28 may be eliminated.

The absorption device 12 is formed in a shape elongated vertically, and brings the gas to be treated introduced through the gas supply path 24 into contact with the absorbent at low temperature introduced through the lean liquid flow path 22. That is, the absorption device 12 causes the gas to be treated to flow upward from below inside the absorption device 12 while causing the absorbent to flow down from above inside the absorption device 12. As a result, the acidic compound in the gas to be treated is absorbed by the absorbent. The treated gas from which the acidic compound has been removed is discharged through the gas discharge path 26, and the absorbent (rich liquid) having absorbed the acidic compound flows through the rich liquid flow path 21.

The absorption device 12 may have any configuration as long as the gas to be treated and the absorbent can be continuously brought into contact with each other. For example, the absorption device 12 may be configured to spray the absorbent into a flow path of the gas to be treated, or may be configured to cause the absorbent to flow down along a filler disposed in the flow path of the gas to be treated. The absorption device 12 may include many fine flow paths into which corresponding one of the gas to be treated and the absorbent is introduced, and may be configured to allow the fine flow paths of the gas to be treated to merge with the corresponding fine flow paths of the absorbent. The absorption device 12 also may be configured to store the absorbent introduced and supply the gas to be treated to the absorbent stored. The absorption device 12 performs absorption of an acidic compound that is an exothermic reaction. The absorption device 12 generates reaction heat that increases temperatures of the gas to be treated and the absorbent.

The release device 14 is formed in a shape elongated vertically, and is configured to cause the absorbent introduced through the rich liquid flow path 21 to flow down in the release device 14.

The release device 14 is provided with a heater 30 for heating the absorbent stored in the release device 14. When the heater 30 heats the absorbent, an acidic compound is desorbed from the absorbent in the release device 14. The desorption of the acidic compound from the absorbent liquid is an endothermic reaction. When the absorbent is heated in the release device 14, not only the acidic compound is desorbed but also water in the absorbent is evaporated. The fluid containing the absorbent and the acidic compound is at high temperature.

The heater 30 includes a heating flow path 32 through which the treated liquid flows, and a reboiler 34 provided in the heating flow path 32. Although the heating flow path 32 includes one end that is connected the lean liquid flow path 22, the one end may be connected to a bottom of the release device 14, i.e., a lower end or near the lower end thereof. The heating flow path 32 includes the other end that is connected to a lower part of the release device 14, the lower part being located close to the bottom of the release device 14.

The reboiler 34 may be provided to heat the absorbent inside the release device 14, or may be configured to heat the absorbent extracted from the release device 14 to the outside as illustrated in the drawing. The reboiler 34 is configured to directly or indirectly heat the absorbent with an appropriate heat source such as electricity, steam, or a burner.

The heater 30 is not limited to the configuration in which the reboiler 34 heats the absorbent, and may include a heat pump for transferring heat generated by the absorption device 12 instead of or in addition to the configuration.

The release device 14 is connected to a supply path 38 for supplying a fluid containing an acidic compound released from the absorbent to a supply destination. The supply path 38 is a flow path for supplying the acidic compound obtained in the release device 14 to the supply destination. The fluid flowing through the supply path 38 contains not only gas of the acidic compound evaporated from the absorbent but also water vapor. The supply path 38 is provided with a condenser 40 for cooling a mixed gas of the gas and the water vapor. When the mixed gas is cooled, the water vapor is condensed, and thus the water vapor can be separated from the acidic compound. As the condenser 40, a heat exchanger using inexpensive cooling water such as river water can be used. The water vapor having been separated is separated from the gas containing the acidic compound by a gas-liquid separator 42. When a pump 45 in a return flow path 44 is operated, condensed water in the gas-liquid separator 42 is returned to the release device 14 through the return flow path 44.

The release device 14 is connected to the rich liquid flow path 21 and the lean liquid flow path 22. The rich liquid flow path 21 is connected to an upper part of the release device 14, the upper part being located close to the top of the release device 14, and allows the absorbent (rich liquid after absorbing the acidic compound) discharged from the absorption device 12 to be introduced into the release device 14. The lean liquid flow path 22 is connected to the bottom of the release device 14, i.e., the lower end or near the lower end, and allows the absorbent (the lean liquid after releasing the acidic compound) to be discharged from the release device 14.

The rich liquid flow path 21 is provided with a pump 47 and a flow regulating valve 48. The pump 47 causes the absorbent (rich liquid) in the absorption device 12 to flow toward the release device 14. The flow regulating valve 48 adjusts a flow rate in the rich liquid flow path 21 so that the absorbent appropriately circulates between the absorption device 12 and the release device 14.

The lean liquid flow path 22 is provided with a pump 49 and a flow regulating valve 50. The pump 49 causes the absorbent (lean liquid) in the release device 14 to flow toward the absorption device 12. The flow regulating valve 50 adjusts a flow rate in the lean liquid flow path 22 in accordance with the flow rate in the rich liquid flow path 21.

The multi-fluid heat exchanger 18 is connected to the rich liquid flow path 21, the lean liquid flow path 22, and the supply path 38, and is configured to heat the absorbent (rich liquid) flowing through the rich liquid flow path 21 with the absorbent (lean liquid) flowing through the lean liquid flow path 22 and the fluid flowing through the supply path 38. That is, the multi-fluid heat exchanger 18 heats the rich liquid before being introduced into the release device 14. The fluid flowing through the supply path 38 contains an acidic compound desorbed from the absorbent.

The multi-fluid heat exchanger 18 of the present embodiment is constituted of a plate heat exchanger. That is, the multi-fluid heat exchanger 18 includes many plates stacked in which gaps between corresponding adjacent plates function as flow paths into which a fluid flows. The multi-fluid heat exchanger 18 is configured such that a flow path (first higher-temperature flow path) 57 through which the lean liquid flows is provided adjacent to one side of a flow path (lower-temperature flow path) 56 through which the rich liquid flows, and the flow path (second higher-temperature flow path) 58 through which the fluid containing the acidic compound desorbed from the absorbent flows is provided adjacent to the other side of the lower-temperature flow path 56.

Figure 2:
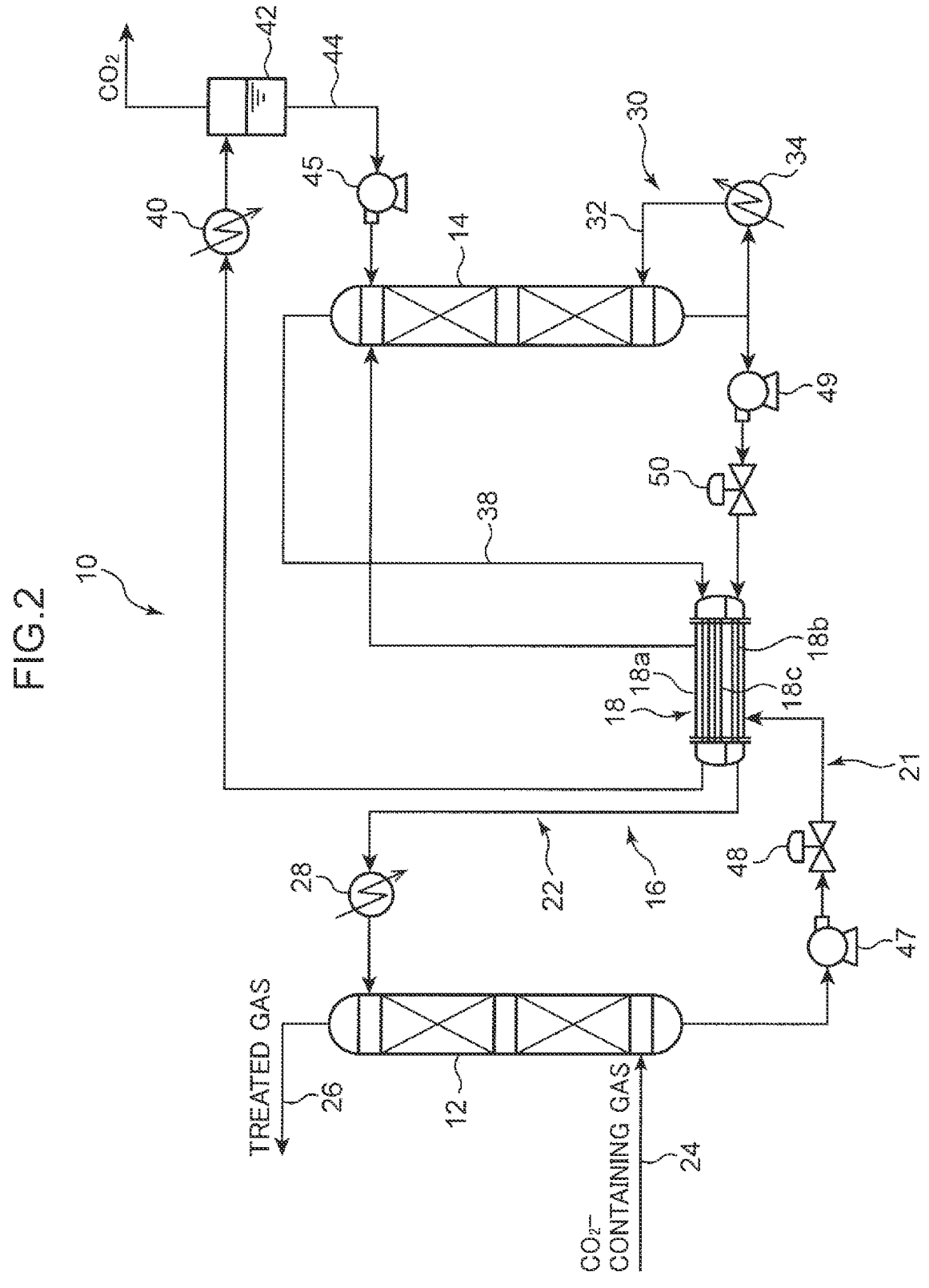
FIG. 2 is a diagram schematically illustrating a general configuration of a gas-treating device according to a modification of the first embodiment.

The multi-fluid heat exchanger 18 is not limited to the plate heat exchanger, and may be constituted of a shell-and-tube heat exchanger as illustrated in FIG. 2. This configuration allows the rich liquid flow path 21 to be connected to a shell 18a to introduce the rich liquid into the shell 18a. The shell 18a is provided inside with a first heat transfer tube 18b and a second heat transfer tube 18c. The lean liquid is introduced into the first heat transfer tube 18b from the lean liquid flow path 22, and the fluid containing the acidic compound desorbed from the absorbent is introduced into the second heat transfer tube 18c from the supply path 38. Then, the rich liquid in the shell 18a is heated by not only the lean liquid through the first heat transfer tube 18b, but also the fluid containing the acidic compound through the second heat transfer tube 18c.

The absorbent is capable of reversibly absorbing and desorbing an acidic compound. The absorbent is an alkaline absorbent containing water, an amine compound, and an organic solvent, for example. The amine compound may be 30 wt %, the organic solvent may be 60 wt %, and the water may be 10 wt %.

Examples of the amine compound include primary amines such as 2-aminoethanol (MEA) and 2-(2-aminoethoxy) ethanol (AEE), secondary amines such as 2-(methylamino) ethanol (MAE), 2-(ethylamino) ethanol (EAE) and 2-(buty-lamino) ethanol (BAE), and tertiary amines such as trietha-nolamine (TEA), N-methyldiethanolamine (MDEA), tetramethylethylenediamine (TEMED), pentamethyldiethyl-enetriamine (PMDETA), hexamethyltriethylenetetramine and bis (2-dimethylaminoethyl) ether.

Examples of the organic solvent include 1-butanol, 1-pen-tanol, octanol, diethylene glycol diethyl ether (DEGDEE), and diethylene glycol dimethyl ether (DEGDME), and a plurality of these solvents may be used in mixture.

According to the article [Hiroshi Machida et al., "Devel-opment of phase separation solvent for CO2 capture by aqueous (amine+ether) solution". J. Chem. Thermodynam-ics 113 (2017) 64-70], when a combination of an amine compound and an organic compound is appropriately selected, an absorbent is obtained in which absorption of an acidic compound causes two-phase separation into a phase having a higher content ratio of the acidic compound and a phase having a lower content ratio of the acidic compound.

When a combination of an amine compound and an organic solvent is appropriately selected, an absorbent is obtained in which absorption of the acidic compound causes two-phase separation into a phase having a higher content ratio of the acidic compound and a phase having a lower content ratio of the acidic compound. Depending on a combination of an amine compound and an organic solvent, even when an absorbent absorbs the acidic compound, the absorbent may not separate into two phases, or the absorbent may separate into two phases before absorbing the acidic compound. However, the present embodiment does not limit the absorbent to an absorbent that separates into phases after absorbing an acidic compound.

Here, a method for treating gas using the gas-treating device 10 according to the first embodiment will be described. The method for treating gas includes an absorp-tion step, a liquid feeding step, and a regeneration step.

The absorption step is of bringing gas to be treated into contact with an absorbent in the absorption device 12. The gas to be treated such as a process gas containing at least carbon dioxide is supplied to the absorption device 12 through the gas supply path 24. The absorbent at low temperature is introduced into the absorption device 12 through the lean liquid flow path 22 of the circulation path 16. The absorbent flows down in the absorption device 12 and comes into contact with gas to be treated to absorb carbon dioxide contained in the gas to be treated. The absorbent (rich liquid) having absorbed carbon dioxide is stored in the absorption device 12. When an absorbent that separates into phases is used as the absorbent, the absorbent having absorbed carbon dioxide separates into a first phase part having a higher content ratio of carbon dioxide and a second phase part having a lower content ratio of carbon dioxide separation.

The liquid feeding step is of feeding the absorbent (rich liquid) in the absorption device 12 from the absorption device 12 to the release device 14. The absorbent is heated in the multi-fluid heat exchanger 18 by the absorbent (lean liquid) flowing through the lean liquid flow path 22 and the fluid containing the acidic compound flowing through the supply path 38, and then is introduced into the release device 14. Thus, the amount of heating with the heater 30 in the release device 14 can be reduced.

The regeneration step is of heating the absorbent intro-duced into the release device 14 to separate carbon dioxide from the absorbent. The absorbent is heated in the release device 14 while flowing down. When an absorbent that separates into phases is used as the absorbent, the absorbent returns to a single phase again after carbon dioxide is desorbed. The fluid containing the carbon dioxide separated from the absorbent flows through the supply path 38 and heats the rich liquid in the multi-fluid heat exchanger 18. The fluid passing through the multi-fluid heat exchanger 18 contains water vapor, and the water vapor is condensed by the condenser 40 in the supply path 38. The water vapor is separated in the gas-liquid separator 42, so that only the carbon dioxide separated from the absorbent is supplied to the supply destination. The absorbent (lean liquid) after the carbon dioxide is separated in the release device 14 flows through the lean liquid flow path 22 and returns to the absorption device 12. During this process, the lean liquid heats the rich liquid flowing through the rich liquid flow path 21 in the multi-fluid heat exchanger 18, so that the lean liquid decreases in temperature.

As in the present embodiment described above, the absor-bent is heated by the heater 30 in the release device 14, and carbon dioxide is released from the absorbent. Thus, the absorbent (lean liquid) and the carbon dioxide are at high temperature. The lean liquid and the fluid containing the carbon dioxide at the high temperature heats the rich liquid, which is before being supplied from the absorption device 12 to the release device 14, in the multi-fluid heat exchanger 18. Thus, the rich liquid to be supplied to the release device 14 can be increased in temperature, so that the amount of heat input using the heater 30 can be reduced. The rich liquid from the absorption device 12 also flows into the multi-fluid heat exchanger 18 without being branched into a flow path for heat exchange with the fluid containing the carbon dioxide and a flow path for heat exchange with the absorbent from the release device 14. This configuration does not require adjusting a flow rate for branching the rich liquid into the rich liquid to be heat exchanged with the fluid containing the carbon dioxide and the rich liquid to be heat exchanged with the lean liquid from the release device 14. Thus, branch design for obtaining desired heat recovery efficiency is unnecessary.

Second Embodiment

Figure 3:
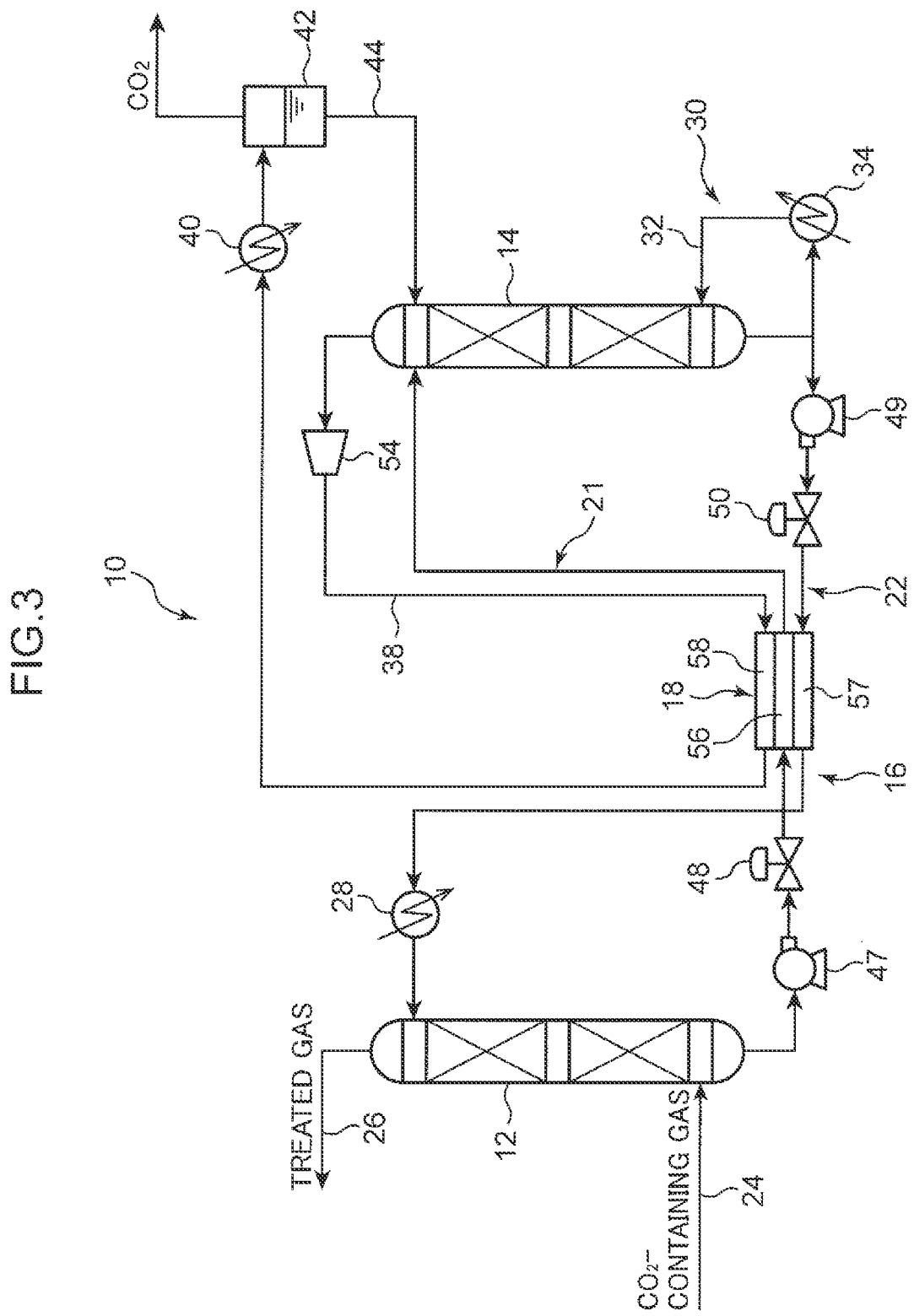
FIG. 3 is a diagram schematically illustrating a general configuration of a gas-treating device according to a second embodiment.

FIG. 3 illustrates a second embodiment of the present invention. Here, the same components as those of the first embodiment are denoted by the same reference numerals, and a detailed description thereof will not be described.

In the second embodiment, a compressor 54 disposed in a supply path 38 is provided. The compressor 54 is disposed between a release device 14 and a multi-fluid heat exchanger 18 in the supply path 38. The compressor 54 compresses a fluid flowing out of the release device 14 and before being supplied to the multi-fluid heat exchanger 18, the fluid being gaseous and containing an acidic compound. Thus, the fluid being gaseous and containing the acidic compound rises in temperature before flowing into the multi-fluid heat exchanger 18.

The present embodiment thus enables the fluid containing the acidic compound to be raised in temperature before flowing into the multi-fluid heat exchanger 18, so that heating efficiency of the absorbent before being supplied from the absorption device 12 to the release device 14 can be improved in the multi-fluid heat exchanger 18.

Although FIG. 3 illustrates an example in which the multi-fluid heat exchanger 18 is constituted of a plate heat exchanger, the multi-fluid heat exchanger 18 may be constituted of a shell-and-tube heat exchanger. Although other configurations, operations, and effects are not described, the description of the first embodiment can be applied to the second embodiment.

Third Embodiment

Figure 4:
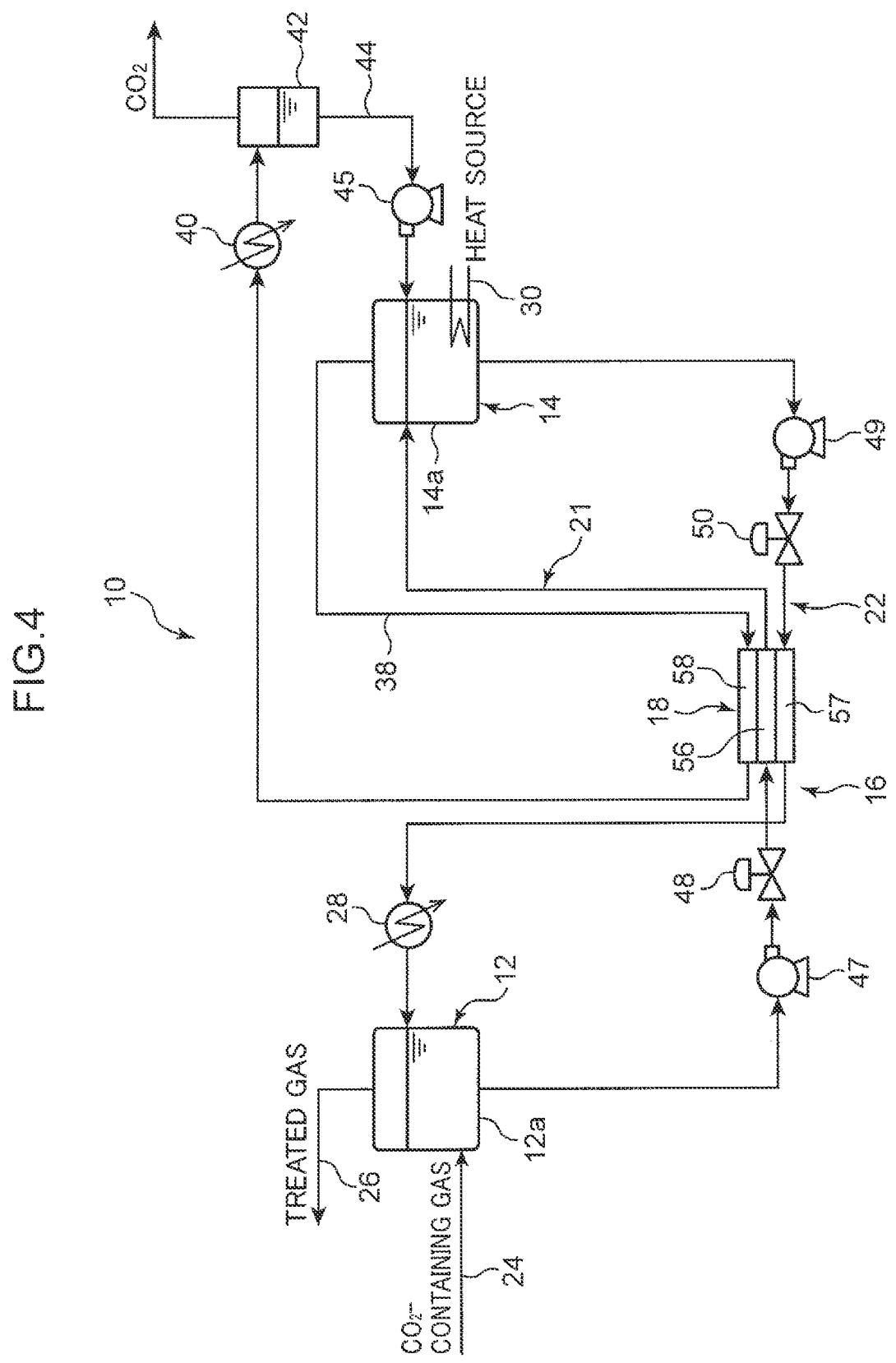
FIG. 4 is a diagram schematically illustrating a general configuration of a gas-treating device according to a third embodiment.

FIG. 4 illustrates a third embodiment of the present invention. Here, the same components as those of the first embodiment are denoted by the same reference numerals, and a detailed description thereof will not be described.

In the third embodiment, an absorption device 12 includes a tank (absorption side tank) 12a configured to store an absorbent, and a release device 14 includes a tank (release side tank) 14a configured to store an absorbent containing an acidic compound.

The absorption side tank 12a is configured to allow the absorbent to come into contact with gas to be treated while the absorbent is stored instead of coming into contact with the gas to be treated while the absorbent flows down. Thus, the absorption side tank 12a has a shape expanding in a horizontal direction rather than a vertical direction. The absorption side tank 12a is formed in a hollow shape for storing the absorbent, and a gas supply path 24 is connected to the absorption side tank 12a at a position below a liquid level of the absorbent stored in the absorption side tank 12a.

The absorbent in the release side tank 14a is heated while being stored instead of gradually being heated while flowing down. Thus, the release side tank 14a has a shape expanding in the horizontal direction rather than the vertical direction. The release side tank 14a is formed in a hollow shape for storing the absorbent, and a heater 30 is disposed below a liquid level of the absorbent stored in the release side tank 14a. The heater 30 is configured to heat the absorbent accumulated in the release side tank 14a.

Unlike the absorption device 12 of a tower type in which the absorbent comes into contact with the gas to be treated while flowing down as in the first embodiment, in the third embodiment, the absorption device 12 includes the absorption side tank 12a configured to allow the absorbent to come into contact with the gas to be treated while the absorbent is stored. This configuration allows the gas to be treated to float upward in the absorbent to stir the absorbent. Thus, absorption efficiency of the gas to be treated using the absorbent can be improved. In particular, when the absorbent is formed to separate into two phases upon absorbing an acidic compound, the two phases being a phase (e.g., an amine phase) having a higher content ratio of the acidic compound and a phase (e.g., an ether phase) having a lower content ratio of the acidic compound, contact efficiency of a phase interface between the amine phase and the ether phase can be improved by stirring the absorbent. As a result absorption efficiency of gas to be treated using the absorbent may be improved.

Also in the third embodiment, the heater 30 heats the absorbent accumulated in the release side tank 14a to release the acidic compound from the absorbent. At this time, releasing the acidic compound enables obtaining a stirring effect of the absorbent accumulated in the release side tank 14a. In particular, when the absorbent is formed to separate into two phases upon absorbing an acidic compound, interfacial contact between one (e.g., an amine phase) of the two phases separated and the other (e.g., an ether phase) can be increased by a flow of the absorbent.

Although in the third embodiment, the absorption device 12 includes the absorption side tank 12a, and the release device 14 includes the release side tank 14a, the present embodiment is not limited to this configuration. For example, while the release device 14 includes the release side tank 14a, the absorption device 12 may be configured to allow the absorbent to come into contact with the gas to be treated while the absorbent flows down. Alternatively, while the absorption device 12 includes the absorption side tank 12a, the release device 14 may be configured to allow the absorbent to heated while the absorbent flows down. Although other configurations, operations, and effects are not described, the descriptions of the first and second embodiment can be applied to the third embodiment.

Fourth Embodiment

Figure 5:
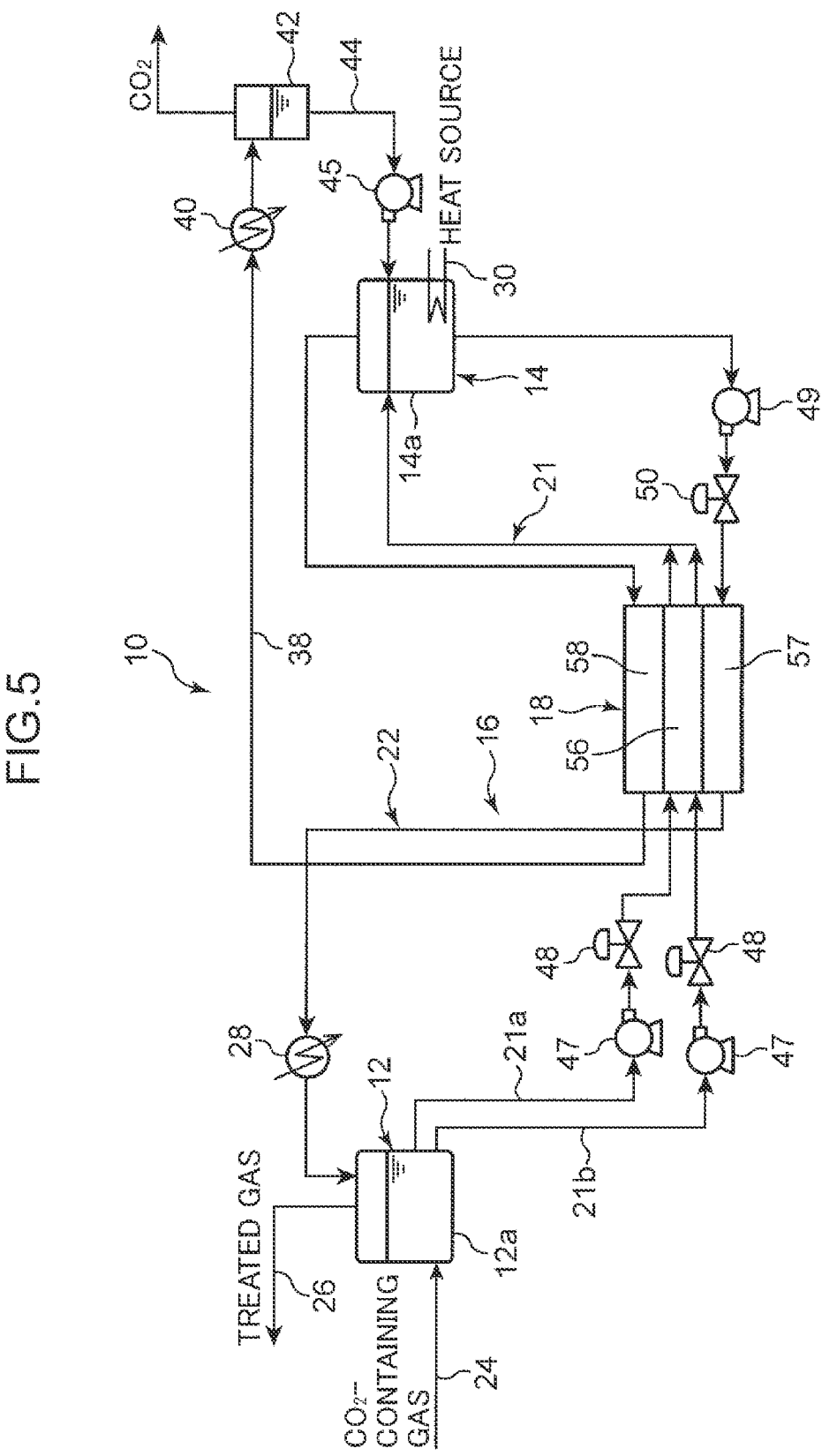
FIG. 5 is a diagram schematically illustrating a general configuration of a gas-treating device according to a fourth embodiment.

FIG. 5 illustrates a fourth embodiment of the present invention. The fourth embodiment is premised on using an absorbent that separates into two phases upon absorbing an acidic compound. Here, the same components as those of the first embodiment are denoted by the same reference numerals, and a detailed description thereof will not be described.

In the third embodiment, a part connecting the absorption device 12 and the multi-fluid heat exchanger 18 in the rich liquid flow path 21 is constituted of one flow path (pipe). In contrast, in the fourth embodiment, a part connecting the absorption device 12 and the multi-fluid heat exchanger 18 in the rich liquid flow path 21 is constituted of two flow paths (pipes) 21a and 21b. That is, the part connecting the absorption device 12 and the multi-fluid heat exchanger 18 in the rich liquid flow path 21 includes a first rich liquid flow path 21a and a second rich liquid flow path 21b. Then, a part connecting the multi-fluid heat exchanger 18 and the release device 14 in the rich liquid flow path 21 is constituted of one flow path (pipe).

A connection part of the first rich liquid flow path 21a to the absorption side tank 12a (absorption device 12) and a connection part of the second rich liquid flow path 21b to the absorption side tank 12a (absorption device 12) are different in a height direction. For example, the connection part of the first rich liquid flow path 21a to the absorption side tank 12a is positionally higher than the connection part of the second rich liquid flow path 21b. Then, the absorbent accumulated in the absorption side tank 12a separates into two phases after absorbing the acidic compound. The two phases separated include the ether phase and the amine phase, the ether phase being lighter than the amine phase, so that the ether phase tends to accumulate at a higher position than the amine phase. Thus, the ether phase mainly flows into the first rich liquid flow path 21a, and the amine phase mainly flows into the second rich liquid flow path 21b.

The first rich liquid flow path 21a and the second rich liquid flow path 21b are each provided with a pump 47 and a flow regulating valve 48.

The multi-fluid heat exchanger 18 is constituted of a plate heat exchanger in which corresponding adjacent plates form gaps serving as flow paths including a flow path (lower-temperature flow path) 56 through which a rich liquid flows, a flow path (first higher-temperature flow path) 57 through which a lean liquid flows, and a flow path (second higher-temperature flow path) 58 through which a fluid containing an acidic compound desorbed from an absorbent flows. Among these flow paths, the lower-temperature flow path 56 includes a first branched flow path 56a into which the ether phase mainly flows through the first rich liquid flow path 21a, and a second branched flow path 56b into which the amine phase mainly flows through the second rich liquid flow path 21b.

Figures 6A, 6B:
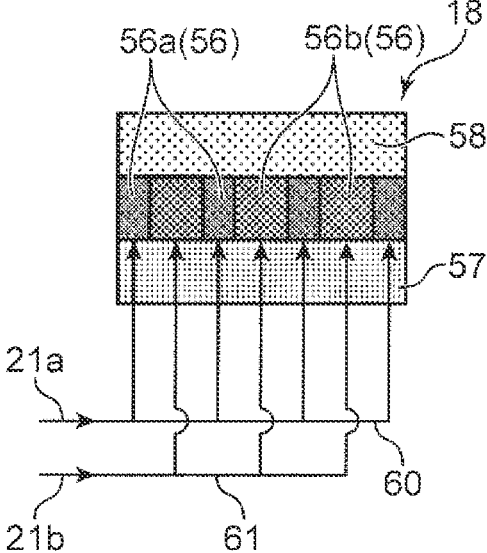
FIG. 6A is a diagram schematically illustrating a configuration of a multi-fluid heat exchanger.
FIG. 6B is a diagram schematically illustrating a configuration of a multi-fluid heat exchanger.
Figure 7:
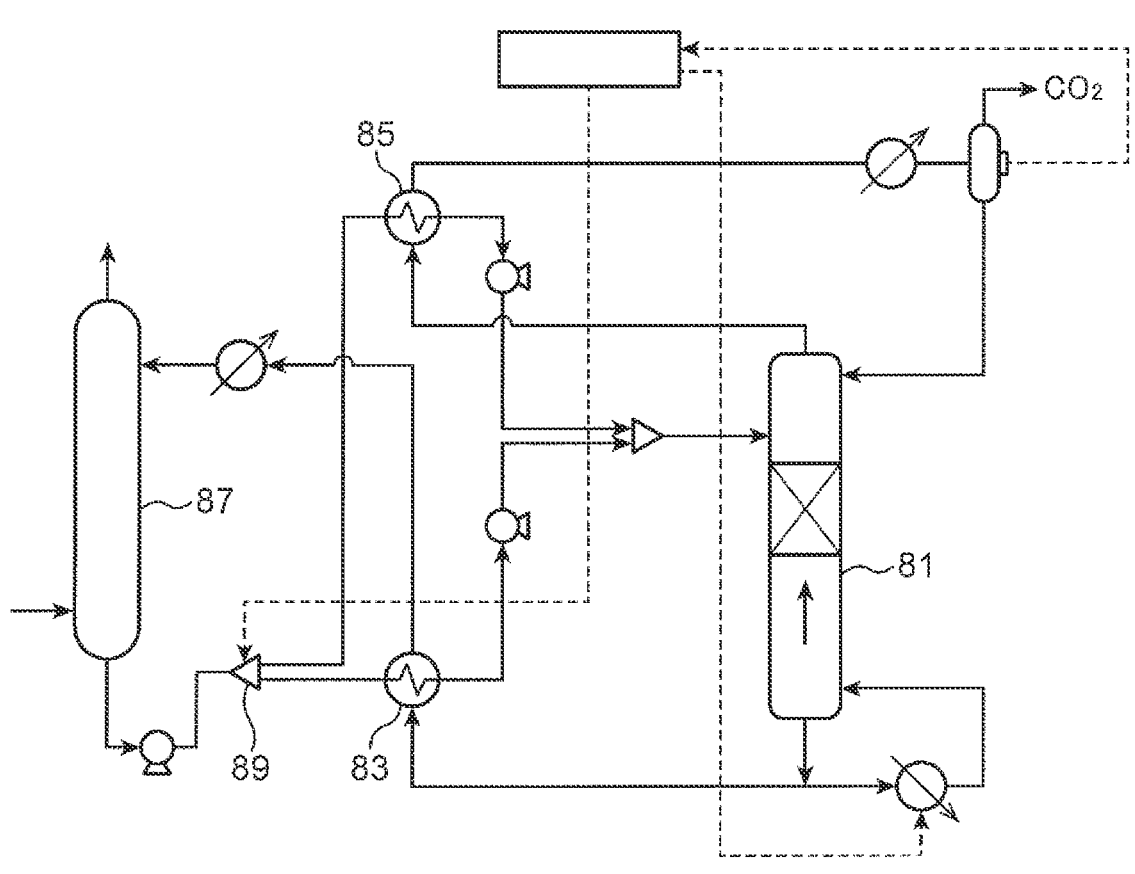
FIG. 7 is a diagram illustrating a configuration of a conventional carbon dioxide recovery apparatus.

The first branched flow path 56a and the second branched flow path 56b are adjacent to each other as illustrated in FIG. 6A. This configuration may cause heat exchange between the ether phase flowing into the first branched flow path 56a and the amine phase flowing into the second branched flow path 56b. That is, a difference in a heat transfer coefficient between the ether phase and the amine phase may cause a difference in a rate of temperature rise between the ether phase and the amine phase. This case causes heat exchange between the ether phase and the amine phase. The difference in a rate of temperature rise between the ether phase and the amine phase is also caused by a difference in a flow rate, specific heat, or the like between the ether phase and the amine phase.

Although FIG. 6A illustrates a configuration in which one first branched flow path 56a and one second branched flow path 56b are formed, the present embodiment is not limited thereto. As illustrated in FIG. 6B, a plurality of first branched flow paths 56a and a plurality of second branched flow paths 56b may be formed. In this case, the first rich liquid flow path 21a is connected to a header 60, and the header 60 distributes the ether phase having flowed through the first rich liquid flow path 21a to each first branched flow path 56a. The second rich liquid flow path 21b is also connected to a header 61, and the header 61 distributes the amine phase having flowed through the second rich liquid flow path 21b to each second branched flow path 56b.

Thus, the present embodiment allows the absorbent from the absorption device 12 to be heated by the fluid containing the acidic compound and the absorbent from the release device 14 in any one of the first branched flow path 56a and the second branched flow path 56b. At this time, each of the first branched flow path 56a and the second branched flow path 56b can obtain the amount of heat exchange according to its flow path area.

The present embodiment also enables preventing complicated performance design of the multi-fluid heat exchanger 18 even when two phases separated in the absorbent are greatly different in a flow rate, physical properties, and the like from each other. That is, when one of the two phases separated mainly flows into the first branched flow path 56a, the amount of heat exchange in the first branched flow path 56a can be estimated from a flow rate and temperature of the absorbent flowing into the first branched flow path 56a, and when the other of the two phases separated mainly flows into the second branched flow path 56b, the amount of heat exchange in the second branched flow path 56b can be estimated from a flow rate and temperature of the absorbent flowing into the second branched flow path 56b. Thus, the multi-fluid heat exchanger 18 can be designed relatively easily.

In the present embodiment, the connection part of the first rich liquid flow path 21a to the absorption side tank 12a (absorption device 12) and the connection part of the second rich liquid flow path 21b to the absorption side tank 12a (absorption device 12) are different in the height direction. This configuration enables one of the two phases separated to mainly flow into the first branched flow path 56a, and the other to mainly flow into the second branched flow path 56b by using the absorbent separated into two phases and accumulated in the absorption device 12.

The present embodiment also enables preventing increase in a difference in temperature between the fluid flowing through the first branched flow path 56a and the fluid flowing through the second branched flow path 56b due to heat exchange between the fluid flowing through the first branched flow path 56a and the fluid flowing through the second branched flow path 56b.

Although, in the present embodiment, there is described an example in which the multi-fluid heat exchanger 18 is constituted of a plate heat exchanger, the multi-fluid heat exchanger 18 may be constituted of a shell-and-tube heat exchanger. In this case, a space in a shell 18a is divided into two spaces. One of the spaces functions as the first branched flow path 56a, and the other functions as the second branched flow path 56b.

Although the fourth embodiment is provided with the absorption device 12 including the absorption side tank 12a, and the release device 14 including the release side tank 14a, the present embodiment is not limited to this configuration. For example, while the release device 14 includes the release side tank 14a, the absorption device 12 may be configured to allow the absorbent to come into contact with the gas to be treated while the absorbent flows down. Alternatively, while the absorption device 12 includes the absorption side tank 12a, the release device 14 may be configured to allow the absorbent to be heated while the absorbent flows down. Additionally, the absorption device 12 may be configured to allow the absorbent to come into contact with the gas to be treated while the absorbent flows down, and the release device 14 may be configured to allow the absorbent to be heated while the absorbent flows down. Although other configurations, operations, and effects are not described, the description of the first embodiment can be applied to the second embodiment.

Other Embodiments

It should be understood that the embodiments disclosed herein are illustrative in all respects and are not restrictive. The present invention is not limited to the above embodiments, and various modifications, improvements, and the like can be made without departing from the gist of the present invention. For example, the multi-fluid heat exchanger 18 may be constituted of a single heat exchanger, or may include a plurality of heat exchange units. When the plurality of heat exchange units are provided, each heat exchange unit includes a lower-temperature flow path 56, a first higher-temperature flow path 57, and a second higher-temperature flow path 58. Then, the lower-temperature flow path 56 in one heat exchange unit functions as a first branched flow path 56a, and the lower-temperature flow path 56 in the other heat exchange unit functions as a second branched flow path 56b.

Here, the embodiments will be outlined.

(1) The gas-treating device according to the embodiments includes: an absorption device that receives an absorbent to absorb an acidic compound in a gas to be treated into the absorbent; a release device into which the absorbent having absorbed the acidic compound in the absorption device is introduced; a heater for heating the absorbent in the release device to release the acidic compound contained in the absorbent from the absorbent; and a multi-fluid heat exchanger for heating the absorbent before being supplied from the absorption device to the release device by a fluid containing the acidic compound discharged from the release device and the absorbent before being supplied from the release device to the absorption device.

The gas-treating device according to the embodiments is configured such that the absorbent is heated by the heater in the release device, and the acidic compound is released from the absorbent. Thus, the absorbent and the acidic compound are at high temperature in the release device. The absorbent and the fluid containing the acidic compound at high temperature heats the absorbent before being supplied from the absorption device to the release device in the multi-fluid heat exchanger. Thus, the absorbent to be supplied to the release device can be increased in temperature, so that the amount of heat input using the heater can be reduced. The absorbent from the absorption device also flows into the multi-fluid heat exchanger without being branched into a flow path for heat exchange with the fluid containing the acidic compound and a flow path for heat exchange with the absorbent from the release device. This configuration does not require adjusting a flow rate for branching the absorbent from the absorption device into the absorbent to be heat exchanged with the fluid containing the acidic compound and the absorbent to be heat exchanged with the absorbent from the release device. Thus, branch design for obtaining desired heat recovery efficiency is unnecessary.

(2) The multi-fluid heat exchanger may include a first branched flow path into which one part of the absorbent before being supplied from the absorption device to the release device flows, and a second branched flow path into which a remnant of the absorbent flows. In this case, the first branched flow path may be configured to heat the one part of the absorbent by the fluid containing the acidic compound discharged from the release device and the absorbent supplied from the release device to the absorption device. Additionally, the second branched flow path may be configured to heat the remnant of the absorbent by the fluid containing the acidic compound discharged from the release device and the absorbent supplied from the release device to the absorption device.

This aspect allows the absorbent from the absorption device to be heated by the fluid containing the acidic compound and the absorbent from the release device in any one of the first branched flow path and the second branched flow path. At this time, each of the first branched flow path and the second branched flow path can obtain the amount of heat exchange according to its flow path area.

(3) The absorbent may be an absorbent formed to separate into two phases upon absorbing the acidic compound. In this case, one of the two phases separated in the absorbent may mainly flow into the first branched flow path, and the other of the two phases separated in the absorbent may mainly flow into the second branched flow path.

This aspect enables suppressing complication of performance design of the multi-fluid heat exchanger even when one of the two phases separated in the absorbent is different in a heat transfer coefficient from the other of the two phases. That is, when one of the two phases separated mainly flows into the first branched flow path, the amount of heat exchange in the first branched flow path can be estimated from a flow rate and temperature of the absorbent flowing into the first branched flow path, and when the other of the two phases separated mainly flows into the second branched flow path, the amount of heat exchange in the second branched flow path can be estimated from a flow rate and temperature of the absorbent flowing into the second branched flow path. Thus, the multi-fluid heat exchanger can be designed relatively easily. In contrast, when one and the other of the two phases separated flow into the first branched flow path and the second branched flow path, the amount of heat exchange in each of the branched flow paths is less likely to be estimated unless an inflow ratio between the one and the other of the two phases separated is determined. This case causes difficulty in design of the multi-fluid heat exchanger.

(4) The absorption device may allow the absorbent having absorbed the acidic compound to be accumulated while the absorbent is separated into two phases. In this case, the first branched flow path may be connected to the absorption device through a first rich liquid flow path, and the second branched flow path may be connected to the absorption device through a second rich liquid flow path provided separately from the first rich liquid flow path.

This aspect enables one of the two phases separated to mainly flow into the first branched flow path, and the other to mainly flow into the second branched flow path by using the absorbent separated into two phases and accumulated in the absorption device.

(5) The first branched flow path and the second branched flow path may be adjacent to each other to cause heat exchange between the one of the two phases separated, flowing through the first branched flow path, and the other of the two phases separated, flowing through the second branched flow path.

When one of the two phases separated in the absorbent is different in a heat transfer coefficient from the other of the two phases, a degree of temperature rise may be different between a fluid flowing through the first branched flow path and a fluid flowing through the second branched flow path. This aspect enables suppressing increase in a difference in temperature between the fluid flowing through the first branched flow path and the fluid flowing through the second branched flow path due to heat exchange between the fluid flowing through the first branched flow path and the fluid flowing through the second branched flow path.

(6) The multi-fluid heat exchanger may be a plate heat exchanger or a shell-and-tube heat exchanger. This aspect enables the multi-fluid heat exchanger to be constituted of a general-purpose heat exchanger.

(7) The gas-treating device may further include a compressor for compressing a fluid containing the acidic compound discharged from the release device and before being supplied to the multi-fluid heat exchanger.

This aspect enables the fluid containing the acidic compound to be raised in temperature before flowing into the multi-fluid heat exchanger, so that heating efficiency of the absorbent before being supplied from the absorption device to the release device can be improved in the multi-fluid heat exchanger.

(8) The absorption device may include a tank configured to store the absorbent. In this case, a gas supply path through which the gas to be treated flows into the tank may be connected to the tank at a position below a liquid level of the absorbent stored in the tank.

This aspect allows the gas to be treated to float upward in the absorbent to stir the absorbent. Thus, absorption efficiency of the gas to be treated using the absorbent can be improved.

(9) The release device may include a tank configured to store the absorbent containing the acidic compound. In this case, the heater may be configured to heat the absorbent containing the acidic compound and accumulated in the tank.

This aspect allows the heater to heat the absorbent accumulated in the tank to release the acidic compound from the absorbent. At this time, releasing the acidic compound enables obtaining a stirring effect of the absorbent accumulated in the tank. In particular, when the absorbent is formed to separate into two phases when absorbing an acidic compound, interfacial contact between one of the two phases separated and the other can be increased by a flow of the absorbent.

As described above, heat recovery with a lean liquid and desired heat recovery efficiency with a fluid containing an acidic compound can be obtained without requiring a branching design.

The invention claimed is:

1. A gas-treating device comprising:
an absorber that receives an absorbent to absorb an acidic compound in a gas to be treated into the absorbent;
a releaser into which the absorbent having absorbed the acidic compound in the absorber is introduced;
a heater for heating the absorbent in the releaser to release the acidic compound contained in the absorbent from the absorbent; and
a multi-fluid heat exchanger for heating the absorbent before being supplied from the absorber to the releaser by a fluid containing the acidic compound discharged from the releaser and the absorbent before being supplied from the releaser to the absorber, wherein
the multi-fluid heat exchanger includes a first branched flow path in which one part of the absorbent flows from the absorber to the releaser, and a second branched flow path in which a remnant of the absorbent flows from the absorber to the releaser,
the absorbent is an absorbent that separates into two phases upon absorbing the acidic compound,
the absorber is configured to allow the absorbent having absorbed the acidic compound to be accumulated while the absorbent is separated into two phases,
the first branched flow path is connected to the absorber through a first rich liquid flow path,
the second branched flow path is connected to the absorber through a second rich liquid flow path provided separately from the first rich liquid flow path,
one of the two phases separated in the absorbent mainly flows into the first branched flow path through the first rich liquid flow path, and
the other of the two phases separated in the absorbent mainly flows into the second branched flow path through the second rich liquid flow path.

2. The gas-treating device according to claim 1, wherein
the first branched flow path is configured to heat the one part of the absorbent by the fluid containing the acidic compound discharged from the releaser and the absorbent supplied from the releaser to the absorber, and
the second branched flow path is configured to heat the remnant of the absorbent by the fluid containing the acidic compound discharged from the releaser and the absorbent supplied from the releaser to the absorber.

3. The gas-treating device according to claim 2, wherein the first branched flow path and the second branched flow path are adjacent to each other to cause heat exchange between the one of the two phases separated, flowing through the first branched flow path, and the other of the two phases separated, flowing through the second branched flow path.

4. The gas-treating device according to claim 1, wherein the multi-fluid heat exchanger is a plate heat exchanger or a shell-and-tube heat exchanger.

5. The gas-treating device according to claim 1, further comprising a compressor for compressing the fluid containing the acidic compound discharged from the releaser and before being supplied to the multi-fluid heat exchanger.

6. The gas-treating device according to claim 1, wherein
the absorber includes a tank configured to store the absorbent, and
a gas supply path through which the gas to be treated flows into the tank is connected to the tank at a position below a liquid level of the absorbent stored in the tank.

7. The gas-treating device according to claim 1, wherein
the releaser includes a tank configured to store the absorbent containing the acidic compound, and
the heater is configured to heat the absorbent containing the acidic compound and accumulated in the tank.

* * * * *